(12) United States Patent
Painter et al.

(10) Patent No.: US 7,377,842 B2
(45) Date of Patent: May 27, 2008

(54) AUTOMATED EXTRACTION OF CASING CLIPS FROM COOKED MEAT PRODUCTS

(75) Inventors: Cory J. Painter, Madison, WI (US); Terry Lee Holmes, Monona, WI (US)

(73) Assignee: Kraft Foods Holdings, Inc., Northfield, IL (US)

( * ) Notice: Subject to any disclaimer, the term of this patent is extended or adjusted under 35 U.S.C. 154(b) by 763 days.

(21) Appl. No.: 10/703,890

(22) Filed: Nov. 7, 2003

(65) Prior Publication Data

US 2005/0100644 A1 May 12, 2005

(51) Int. Cl.
*A22C 11/00* (2006.01)
(52) U.S. Cl. ........................................................ 452/50
(58) Field of Classification Search .................. 452/49, 452/50
See application file for complete search history.

(56) References Cited

U.S. PATENT DOCUMENTS

| | | | | |
|---|---|---|---|---|
| 2,672,646 A | * | 3/1954 | Demarest et al. | 452/31 |
| 2,689,971 A | * | 9/1954 | Grey | 452/50 |
| 3,487,498 A | * | 1/1970 | Grandon et al. | 452/50 |
| 3,487,499 A | * | 1/1970 | Klyce | 452/50 |
| 6,080,055 A | | 6/2000 | Leining et al. | |

* cited by examiner

*Primary Examiner*—Thomas Price
(74) *Attorney, Agent, or Firm*—Fitch, Even, Tabin & Flannery

(57) ABSTRACT

A method apparatus for removing a casing, particularly a casing with a clip end embedded in the product, is disclosed where the clipped end is clamped and gas is injected into this end to blow out the clip and casing end while the clamped portion prevents the entire casing from being inflated. The air or gas, such as HEPA filtered air, is injected into the product with a needle, for instance, to balloon out the casing in the clamped area to free the previously embedded clip. The clip is then gripped, certain cuts are made in the casing, and the casing is pulled from the product. An injector such as a needle is inserted into the end portion of the product and pressurized gas, such as HEPA filtered air, is injected into the end portion. The injection of the gas causes the casing to balloon out from the product thereby freeing the previously embedded clip. The freed clip is then gripped while the casing is then cut for removal. The casing may be cut in a Y-shape with two cuts beginning approximately at two corners of one side of the square end and angled towards each other along a side of the product. The two cuts meet, and a third cut is made longitudinally along the length of the product beginning at the meeting point of the two angled cuts. The gripped clip and casing are pulled causing the casing to separate from the product along the cut lines.

17 Claims, 4 Drawing Sheets

AUTOMATED EXTRACTION OF CASING CLIPS FROM COOKED MEAT PRODUCTS

BACKGROUND OF THE INVENTION

The invention relates to the removal of a food product from a casing in which the product is formed or cooked and, more specifically, to a method and apparatus for gripping the casing by an end clip to facilitate the separation of the casing from the product.

Many food products are formed by placing a flowable batter or mixture in a large casing, placing the casing in a mold that gives the product a desired shape, cooking or otherwise setting the product so that it will retain the desired shape, and subsequently removing the casing. Examples include processed meat products formed from chopped or otherwise processed meat and other ingredients such as salt, water and spices. In some such products the mold has generally flat ends that are perpendicular to the longitudinal axis of the product, i.e., square ends. The ends of the casing are often secured with clips. The clips may become embedded in the ends of the product while the product is being cooked, particularly where the ends are flat, which may impede efforts to remove the casing. The term "sausage" is used broadly herein to denote products comprising a filling disposed in a casing.

U.S. Pat. No. 6,080,055, to Leining, et al., entitled "Method and Apparatus for Stripping Casings from Sausages," describes a method of removing casings from round sausage sticks having hemispherical ends wherein the sticks are indexed sideways into a machine. In this method, the casing is inflated prior to removal.

There remains a need for an improved, automated method and apparatus for removing casings from food products.

SUMMARY

In accordance with an embodiment, there is provided a new and improved method and apparatus for removal of a casing closed by a clip positioned at or embedded in the end of a product within the casing. The method comprises clamping the casing near an end and injecting a gas such as air adjacent the end to blow out the clip and casing end while the clamping prevents the entire casing from being inflated.

Clamping the casing near an end may comprise application of clamping pressure with only a single clamping mechanism, or may comprise applying clamping pressure with two separate clamping mechanisms at first and second locations at different distances from the proximal end of the sausage.

In the latter case, the method may comprise effecting partial inflation of the casing between the first location and the end, thereby dislodging the casing clip from the filling and effecting partial separation of the casing from the filling; engaging the dislodged clip; and releasing clamping pressure at the first location while maintaining clamping pressure at the second location to effect further partial inflation of the casing and further partial separation of the casing from the filling between said first location and said second location.

Where two clamping mechanisms are employed, the distance between the end and the second location is preferably less than about ¼ of the length of the sausage, and may be less than ⅙ of the length. In some embodiments, the distance is between about ¹⁄₁₂ and ¼ of the length. The distance may be between ¹⁄₁₂ and ⅙ of the length. The length may be, e.g., about six feet. In absolute terms, the second location may be, e.g., less than 18 in., less than 12 in., between 6 in. and 18 in., or between 6 in. and 12 in. from the proximal end. Where only a single clamping mechanism is employed, the distance between the proximal end and the clamping mechanism may be the same as or similar to the above-described distances between the proximal end and the second clamping mechanism, or may be much larger or smaller.

In either case, after partial inflation of the casing; the casing may be stripped by effecting displacement of the casing clip relative to the filling. The location(s) of the clamp(s) may be selected to strike a balance between inflating enough of the casing to facilitate stripping while limiting the extent of inflation to avoid or limit the problems associated with inflation discussed below.

One potential problem with inflation of the casing is that inflation may result in some of the filling sticking to the interior of inflated portions of the casing, resulting in decreased yield and/or irregularly shaped product. Increasing the extent of inflation may increase adherence of filling. Another potential problem is that some portions of the casing may not inflate, because the casing may be constrained at certain locations by adherence to the filling.

An injector such as a needle may be inserted into the end portion of the product to inject the gas. The gas may be pressurized gas, and may be HEPA filtered air. The injection of the gas causes the casing to balloon out from the product, thereby freeing the previously embedded clip. The freed clip may then be gripped while the casing is scored for removal. The method may be performed at one or both ends of the sausage.

The casing may be cut in a Y-shape while the casing is gripped or before the casing is gripped. The Y-shaped cut comprises a pair of converging cuts that join at a longitudinal cut. Where the product has a square cross-section with generally flat ends, the converging cuts may start at two adjacent end corners on one side, and be angled toward each other along that side. The two cuts may meet approximately at the center of the side, with the third cut extending along the length of the product beginning at the meeting point of the two angled cuts to divide the side of the casing. When the casing is gripped at the clip, the end portion adjacent the converging cuts may be pulled away from the product, and pulled to a side of the product opposite the side of the longitudinal cut. This causes the side portion of the casing defined by the angled cuts to separate. The end portion of the casing may then be pulled along the opposite side of the product so that the casing separates along the longitudinal cut and the casing is peeled back from the product.

After removal of the casing, the filling may be sliced, and the slices may then be packaged for retail sale.

DETAILED DESCRIPTION OF PREFERRED EMBODIMENTS

Figure 1:
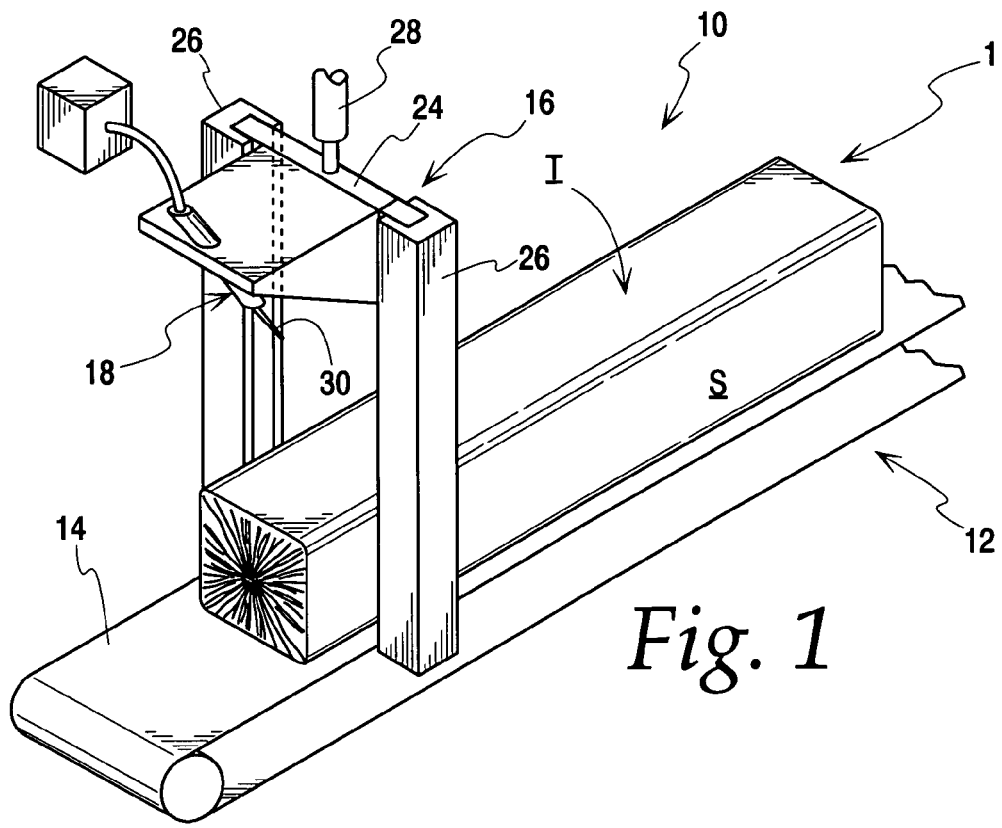
FIG. 1 is a perspective view of an encased product and a first stage of an apparatus in accordance with a first embodiment of the invention, showing a first clamping mechanism with a retracted injector prior to injection.

Referring initially to FIG. 1, a first stage 12 of a method and apparatus 10 of an embodiment of the invention for removing a casing 20 of a product 1 is depicted including a conveyor 14, a clamping mechanism 16, and an injector 18. The product 1 is a food product comprising, for instance, a cheese log, vegetarian sausage, or meat sausage. The product 1 is formed and defined within the casing 20 (see, e.g., FIG. 3). In the illustrated embodiment, the casing 20 is generally rectangular and may typically have a 4.25 inch square cross-section.

In operation, a series of products 1 are individually and sequentially indexed into the apparatus 10 beginning with the first stage 12 of FIG. 1. The product 1 is, for instance, moved in its longitudinal direction along the conveyor 14 to a specified point so that the clamping mechanism 16 is locatable around the product 1. The clamping mechanism 16 then applies compression to the product 1 to define an end portion 22.

The illustrated clamping mechanism 16 includes a clamping head member 24, a pair of side members 26, and an actuator 28. The actuator 28, for instance a pneumatically-driven cylinder, drives the head member 24 toward the product 1 which is positioned between the side members 26. The illustrated side members 26 are rails along which the head member 24 is driven. The illustrated movable head member 24 may be described as a guillotine clamping member.

In the alternative, the clamping mechanism 16 may be any configuration of one or more members which are brought together to form a clamp that encircles a portion of the product 1. For instance, the clamping mechanism 16 may be in the form of a collar. The clamping mechanism 16 may be a single, unitary member circumscribing the product 1 such as a two or three-sided (U-shaped) member which presses the product against another surface to circumscribe the product 1 in tandem with the clamping mechanism 16 (such as pressing downward to form a collar in conjunction with the conveyor 14). In other embodiments, the side members 26 may be movable toward and away from each other to clamp and release the sides of the sausage, or the clamping member may comprise a single inflatable collar.

Figure 2:
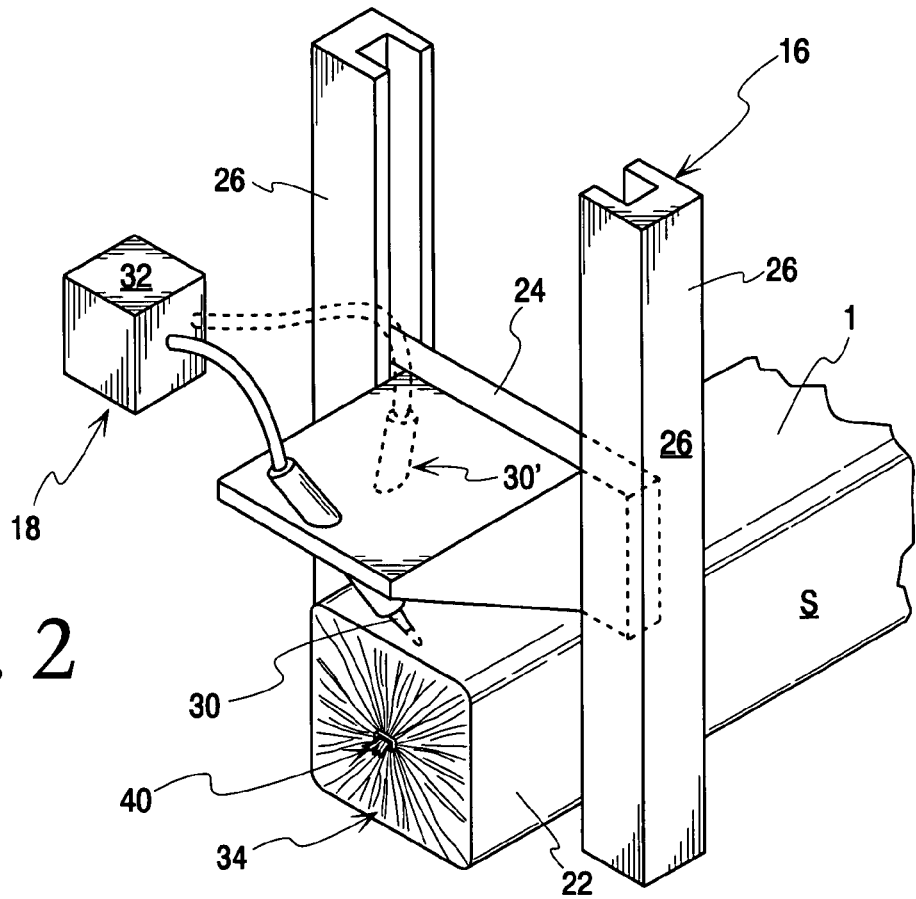
FIG. 2 is a fragmentary perspective view thereof showing an end of the encased product with an inserted injector prior to injection.

A needle 30 associated with the injector 18 is then inserted through the casing 20 and into the product 1, as can be seen in FIG. 2. The needle 30 is preferably located on the head member 24 and movable therewith. Accordingly, the movement of the head member 24 as a result of the actuator 28 effects the insertion of the needle 30 into the product 1, as is depicted. Alternatively, the needle 30 may be equipped with a needle actuator (not shown) which drives the needle 30 into the product 1. The needle actuator may be driven by an electric motor (not shown) or other mechanical means, or may be driven by the gas flow of a pressurized gas source 32 (discussed below).

As the head member 24 forms a guillotine clamping member, the head member 24 is driven against the product 1 by the actuator 28. In this manner, a bottom surface of the head member 24 clamps against the product 1, which itself is slightly deformable. As the head member 24 compresses the product 1 on a top T surface, the product 1 deforms outwardly at its side surfaces S. Accordingly, the side surfaces S are pressed against the side members 26 so that the product is clamped between the head member 24, the conveyor 14, and the side members 26. The side members 26 may be movable so that they may be moved inward relative to each other to clamp the product during inflation, then moved outward after removal of the clip to facilitate release. It should be noted that the deformability of the product 1 may be utilized with other configurations for the clamping mechanism 16 so that, for instance, a three-sided U-Shaped clamp pressing the product 1 into the conveyor 14 utilizes the same characteristic to clamp the product 1 within the clamping mechanism 16 and the conveyor 14.

In one embodiment, the injector 18 includes a needle 30 with a 1/16" outer diameter and a length of approximately 1/2 inch. The injector 18 is connected to a pressurized gas source 32 that preferably provides HEPA filtered air suitable for contact with and injection in food product. As shown, the needle 30 of the injector 18 is inserted into the end portion 22 of the product 1 so that it pierces the casing 20. As depicted, the injector 18 is angled toward the center of the product 1. As an alternative embodiment, a needle 30' (depicted in phantom in FIG. 2) may be angled so that it is pointed toward the adjacent end 34 of the product 1. In this alternative embodiment, the needle 30 delivers the gas toward the end 34. Finally, an injector may be positioned in a substantially vertical orientation (not shown).

The gas is preferably delivered by the gas source 32 at 90 P.S.I. The gas may be delivered at a flow rate that may cause damage to the integrity of the product in the region immediately adjacent to the needle 30. However, it is generally acceptable to discard up to 1/2 inch of the end of the product 1. Discarding of the end of the product 1 is often necessary to present a uniform product. The clamping mechanism 16 is used to prevent the gas from moving through the product 1 in any area other than in the end portion 22.

Figure 3:
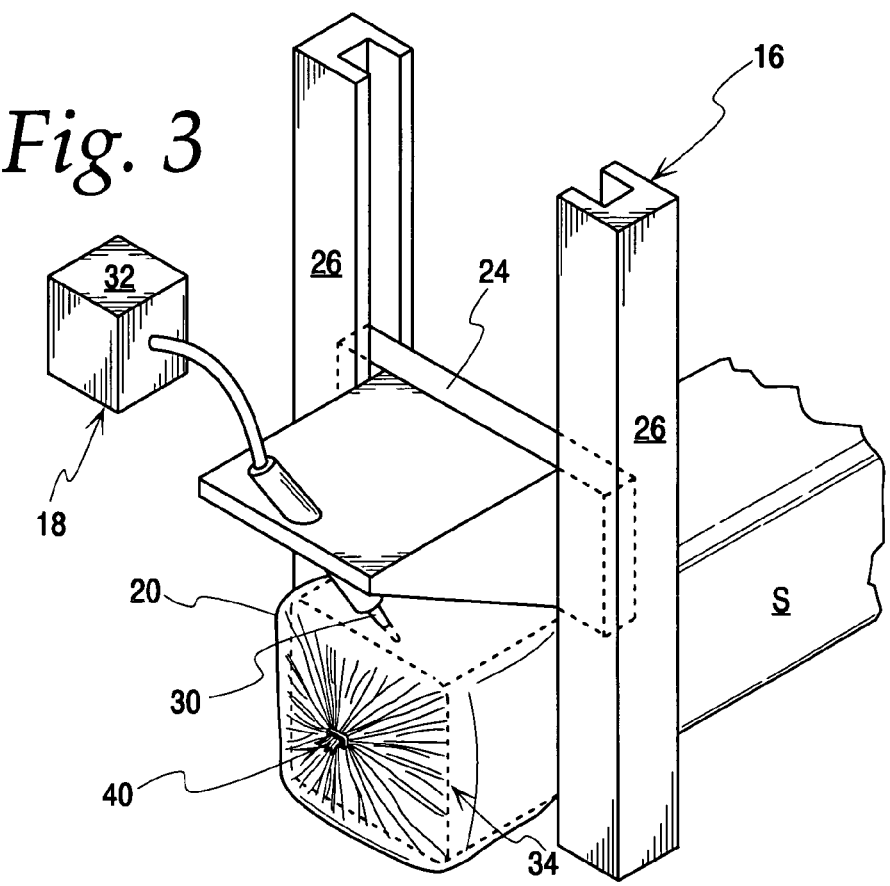
FIG. 3 is a fragmentary perspective view thereof after injection.

FIG. 3 depicts the product 1 after gas has been injected by the needle 30 to free a clip 40 that had been embedded in the product 1, as shown in FIG. 2. In FIG. 3, the end of the casing 20 has ballooned from the injected gas such that the casing 20 pulls away from the end 34 of the product 1 and the clip 40 is freed.

Figure 4:
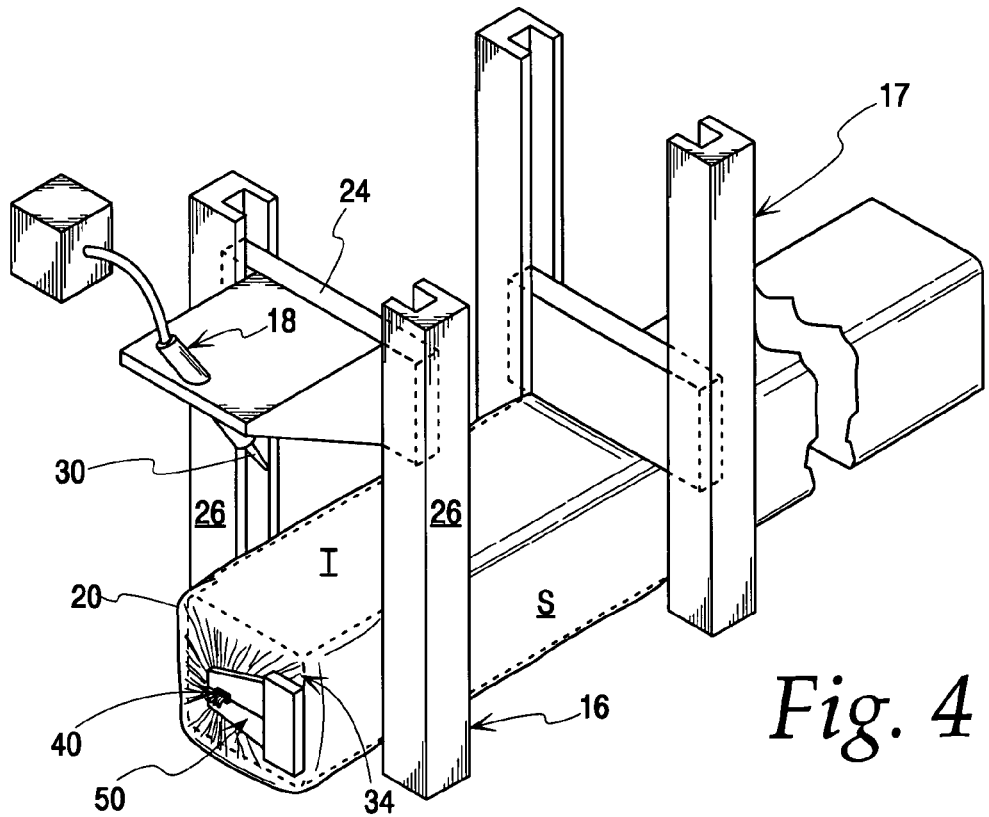
FIG. 4 is a fragmentary perspective view thereof showing a retracted injector after injection, with the end engaged by a gripper, and showing a second clamping mechanism.

Once the clip 40 has been freed, a gripper 50 engages the clip 40 (FIG. 4). In the illustrated embodiment, the gripper 50 may engage the clip 40 prior to removal of the needle 30. The pressure and volume of injected gas are selected with respect to the strength of the casing 20 so that the casing does not rupture or peel open as a result of the gas injection. The casing 20 may stretch inelastically due to the gas injection. The needle 30 may be removed prior to the gripper 50 engaging the clip 40, and the end portion 22 may remain expanded after removal of the needle. It should also be noted that the needle 30 may be inserted into the longitudinal end 34 for injection, in which case it may be necessary to remove the needle 30 prior to the gripper 50 engaging the clip 40, as the needle 30 may otherwise make the clip 40 inaccessible to the gripper 50.

As shown in FIG. 4, the apparatus may include a second clamping mechanism 17 similar to the first clamping mechanism 16, but without an injector. The method may comprise application of clamping pressure with only a single clamping mechanism 16, or may comprise applying clamping pressure with first and second clamping mechanisms 16 and 17 at respective first and second locations at different distances from the proximal end of the sausage.

In the latter case, the method may comprise effecting partial inflation of the casing between the first location and the end, thereby dislodging the casing clip from the filling and effecting partial separation of the casing from the filling; engaging the dislodged clip; and releasing clamping pressure at the first location while maintaining clamping pressure at the second location to effect further partial inflation of the casing and further partial separation of the casing from the filling between said first location and said second location, to facilitate later removal of the casing.

Figure 5:
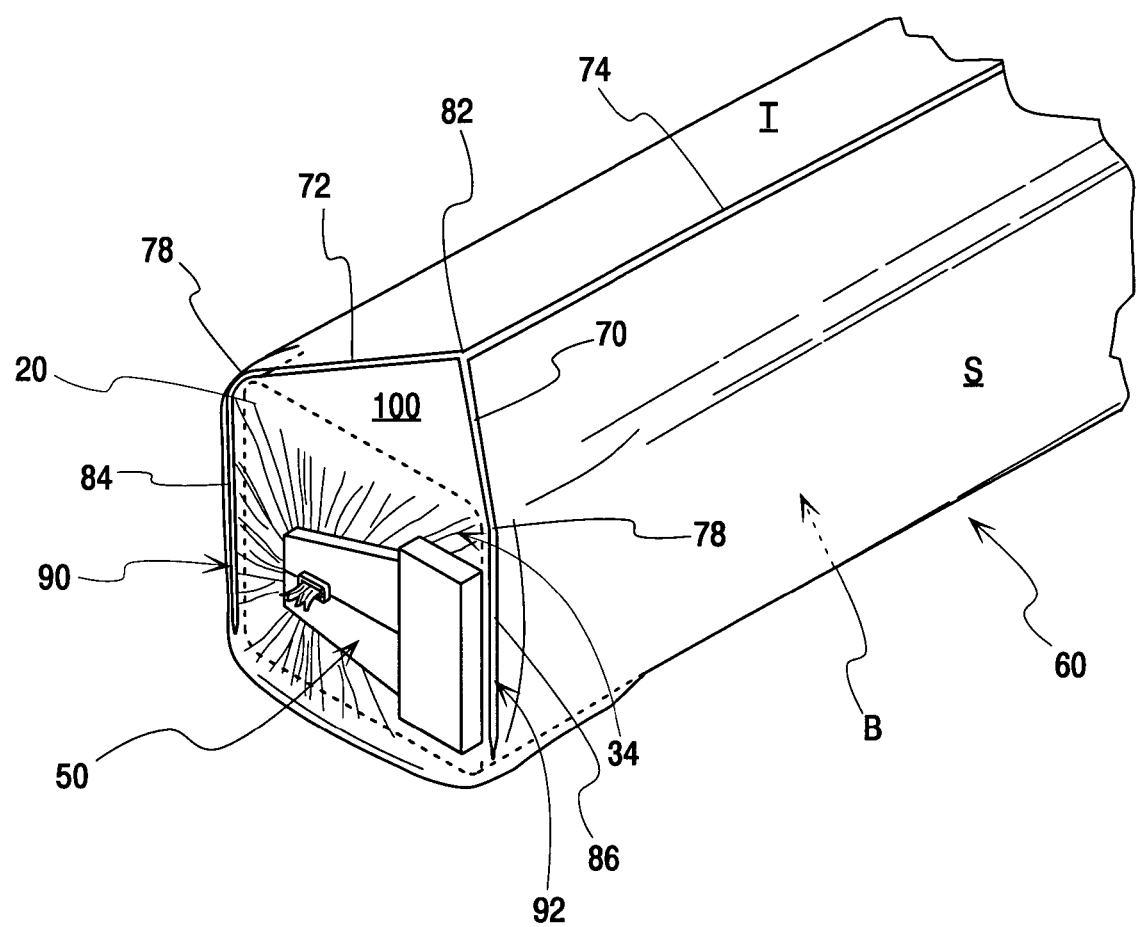
FIG. 5 is a perspective view of the encased product and a gripper, with initial cuts formed in the casing.

Once the needle 30 and the clamping mechanism 16 have been removed, the product 1 may be advanced to a second stage 60, as depicted in FIG. 5. The product 1 may be advanced to the second stage 60 by a conveyor or ram or other structure prior to the gripper 50 engaging the protruding clip 40. Alternatively, the gripper 50 may engage the clip 40 and pull the product 1 to the second stage 60. As a further alternative, the product 1 may simply remain in place and different parts of the apparatus 10 may act upon the product 1.

In the second stage, the casing 20 is to be removed from the product 1. To this end, cuts 70, 72, and 74 are made in the casing 20. Preferably, one or more cutting devices (not shown) are located above the top T of the product 1. The cutting devices form cuts 70 and 72 which begin generally near the upper corners 78 of the end 34 of the product 1 and converge diagonally to meet the third cut 74 near the lateral center line of the product at 82. The third cut 74 is made along the length of the product 1. In addition, cuts 84 and 86 may be made along vertical edges or sides 90 and 92 of the end 34 of the product 1. As described below, once the cuts have been made, the gripper 50 may remove the casing by moving downward and longitudinally inward along the length of the food product.

As an alternative, the locations of the cuts relative to the top and bottom of the product 1 may be reversed. That is, the cuts 70, 72, and 74 may be made in the bottom B of the product 1, and the gripper 50 may move from a position depicted in FIGS. 4 and 5 to a position above the product 1.

Figure 6:
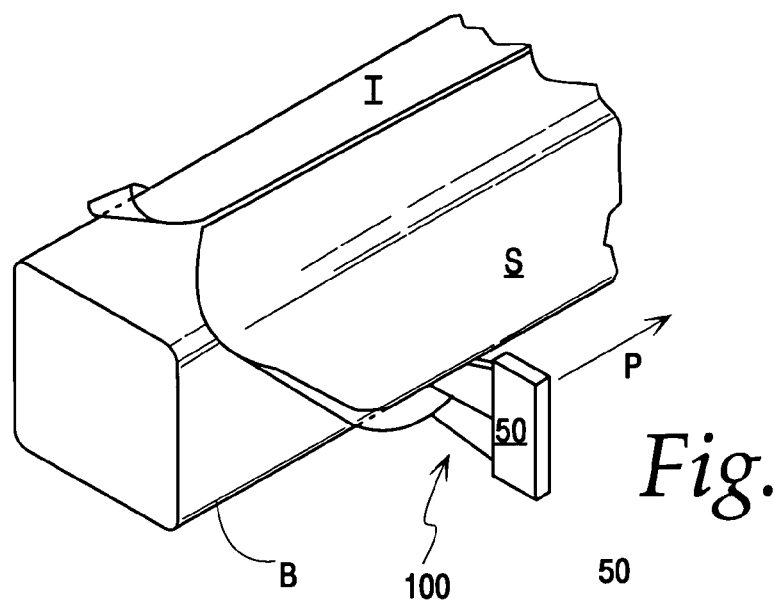
FIG. 6 is a perspective view of the encased product and a gripper depicting the casing being removed from the product.

In the illustrated embodiment, cuts 70 and 72 (and, if present, cuts 84 and 86) define a flap 100 of the casing 20. The gripper 50 holding the clip 40 is moved from the position at the end 34 of the product 1, as depicted in FIGS. 4 and 5, to a position along a bottom B of the product 1, as shown in FIG. 6. The gripper 50 moves relative to the product 1 in a direction represented by arrow P of FIG. 6. In doing so, the flap 100 is pulled from the top T of the product 1, the ballooned portion of the casing 20 is pulled down along, and the casing 20 along sides S, top T, and bottom B of the product 1 is peeled from the product 1. The cut 74 provides for the casing 20 to separate easily and peel away from the product 1. Once the casing 20 has been removed, the product 1 may then be conveyed to further processing, and another product 1 may be indexed into the apparatus 10.

It should be noted that, while the gripper 50 is described as being moved relative to the product, either or both of the gripper 50 and product 1 maybe moved relative to each other. That is, the gripper 50 may be moved along the length of the product 1, the product 1 may be moved relative to the gripper 50 (by means of, for instance, a plunger or actuator), or both. In addition, while a moving cutting device is preferred for making the angled cuts 70 and 72, for making the longitudinal cut 74, a stationary slitter may be employed to slit the casing 20 with the product 1 being moved relative to the stationary slitter, with the gripper 50 also stationary. It should also be noted that the cuts 70, 72, and 74 may be formed only partially through the thickness of the casing, or may comprise perforations, scoring, or other lines of weakness, and may be pre-formed in the casing 20 prior to its being filled.

Figure 7:
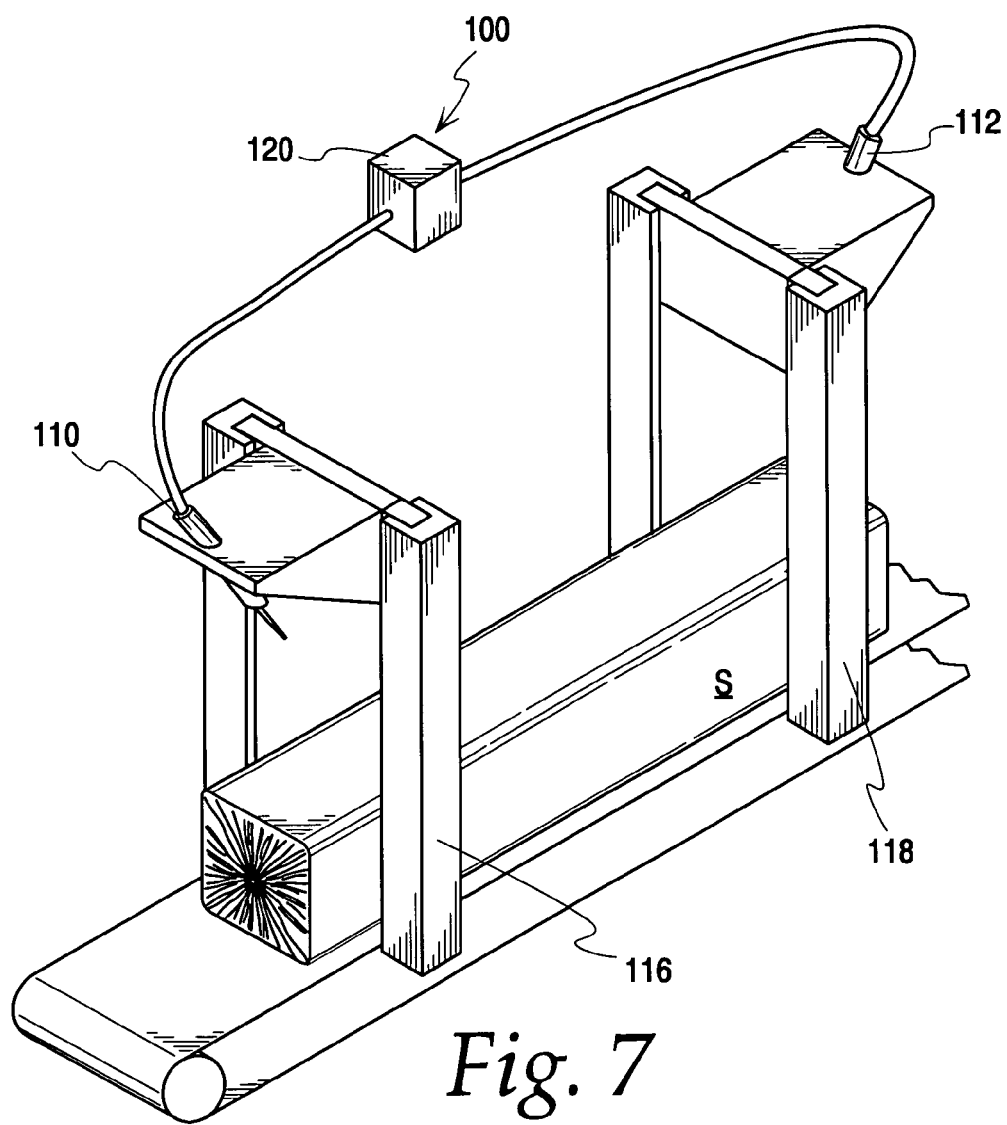
FIG. 7 is a perspective view of a second embodiment of the invention.

Referring now to FIG. 7, another embodiment of the invention is depicted. More specifically, an apparatus 100 is depicted where first and second needles 110, 112 are utilized in conjunction with first and second clamping mechanisms 116, 118. The injectors 110, 112 may utilize a common pressurized gas source 120. The operation of this embodiment is generally that of the above-discussed embodiments.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. An apparatus for removal of a clip from an end of a sausage casing, the apparatus comprising:
   a first clamping mechanism locatable around a periphery of the sausage at a location spaced from a first end of the sausage having a first clip;
   a first injector insertable into the sausage between the clamping mechanism and the first clip;
   a source of pressurized gas in communication with the first injector; and
   a first gripper to engage the first clip.

2. The apparatus of claim 1 wherein the source of pressurized gas provides HEPA filtered air to the injector.

3. The apparatus of claim 1 wherein the source of pressurized gas includes a filter for filtering the gas.

4. The apparatus of claim 1 wherein the gas is injected into a first portion of the sausage between the first end of the sausage and the clamping mechanism by the injector.

5. The apparatus of claim 4 wherein the injected gas effects the separation of filling from casing in the first portion of the sausage.

6. The apparatus of claim 5 wherein the gas causes the clip of the first end of the sausage to protrude from the filling generally along the axis of the sausage.

7. The apparatus of claim 6 wherein the clip of the first end of the sausage casing is gripped by the first gripper for removal of at least a portion of the casing.

8. The apparatus of claim 4 wherein the clamping mechanism substantially prevents gas passing to from the first portion of the sausage to a portion opposite the clamping mechanism.

9. The apparatus of claim 1 wherein the injector is a needle inserted at an angle toward the first portion of the sausage.

10. The apparatus of claim 1 wherein the apparatus further comprises:
   a second clamping mechanism locatable around the periphery of the sausage at a location between the first clamping mechanism and a second end of the sausage wherein the second end has a second clip;
   a second injector insertable into the sausage between the second clamping mechanism and the second clip;
   pressurized gas in communication with the second injector; and
   a second clip gripper.

11. The apparatus of claim 10 wherein the source of pressurized gas is in communication with the second injector.

12. In combination with a system for removing sausage casings from sausage filling, an apparatus for removing a portion of ends of the sausage casing comprising:
- a first clamping mechanism locatable at a first end of the sausage defining a first proximal section of the sausage casing and sausage;
- a second clamping mechanism locatable at a second end of the sausage defining a second proximal section of the sausage casing and sausage, the first and second clamping mechanisms further defining an intermediate section of the sausage casing and sausage;
- first and second injectors for respective proximal sections;
- a source of pressurized gas; and
- first and second casing grippers for respective proximal sections.

13. An apparatus for removing a casing having an end closed by a clip and encasing an elongated product therein, the apparatus comprising:
- a clamp for clamping the casing tightly to the product therein to cause inflating gas flow to remain at a clip end between the clamp and an end enclosed by a clip;
- a pressurized gas injector for injecting gas into the clip end of the casing and for inflating the clip end of the casing to shift the clip outwardly from an adjacent product end and into a gripping position for being gripped; and
- a gripper for gripping the clip end at the gripping position to remove the casing.

14. An apparatus in accordance with claim 13 comprising:
- a cutting device for cutting the casing to form a flap with the clip thereon, being gripped by the gripper, and being pulled relative to the adjacent product end when removing the casing.

15. An apparatus in accordance with claim 14 wherein the cutting device comprises knives for forming a Y-cut to form a flap having a V-shape.

16. An apparatus in accordance with claim 13 wherein the gas injector comprises:
- a slanted hollow needle for injecting through the casing and into the product and slanted with a gas discharging end pointed towards the clip end of the product.

17. An apparatus in accordance with claim 13 wherein the clamp comprises:
- a clamping mechanism for encircling the casing and product.

* * * * *